(12) United States Patent
Thibeault et al.

(10) Patent No.: US 12,192,305 B2
(45) Date of Patent: Jan. 7, 2025

(54) METHOD FOR REAL-TIME DATA ACQUISITION AND RETRIEVAL USING A PASS-THROUGH SCALABLE ARCHITECTURE

(71) Applicant: DATAZOOM INC., New York, NY (US)

(72) Inventors: Jason Thibeault, Chandler, AZ (US); Quinn Thibeault, Tempe, AZ (US); Diane Strutner, San Jose, CA (US)

(73) Assignee: DATAZOOM INC., New York, NY (US)

( * ) Notice: Subject to any disclaimer, the term of this patent is extended or adjusted under 35 U.S.C. 154(b) by 0 days.

(21) Appl. No.: 18/465,442

(22) Filed: Sep. 12, 2023

(65) Prior Publication Data

US 2024/0080375 A1 Mar. 7, 2024

Related U.S. Application Data

(63) Continuation of application No. 17/239,200, filed on Apr. 23, 2021, now Pat. No. 11,792,297, which is a
(Continued)

(51) Int. Cl.
*H04L 67/60* (2022.01)
*G06F 3/06* (2006.01)
(Continued)

(52) U.S. Cl.
CPC ............ *H04L 67/60* (2022.05); *G06F 3/0611* (2013.01); *G06F 16/182* (2019.01);
(Continued)

(58) Field of Classification Search
CPC .......................... H04L 67/32; H04L 67/1004
See application file for complete search history.

(56) References Cited

U.S. PATENT DOCUMENTS

| 7,194,664 | B1 * | 3/2007 | Fung .................. G06F 11/3636 714/45 |
| 2002/0049842 | A1 * | 4/2002 | Huetsch ............. H04L 67/1008 709/225 |

(Continued)

OTHER PUBLICATIONS

U.S. Appl. No. 15/814,848, filed Nov. 16, 2017 captured on Oct. 6, 2023, 185 Pages.
(Continued)

*Primary Examiner* — Esther B. Henderson
(74) *Attorney, Agent, or Firm* — DLA PIPER LLP (US)

(57) ABSTRACT

A device may be configured to monitor operations of at least one application installed on the device. The device may include a processor and a non-transitory memory. When executed by the processor, an application stored in the memory may cause the processor to perform a plurality of operations. A beacon may be embedded in the application. When the application is executed by the processor, the beacon may cause the processor to establish a direct connection with a remote system comprising a storage database, gather data indicative of at least one of the plurality of operations as specified by at least one beacon microservice, and send the data through the direct connection to store the data in the storage database.

26 Claims, 6 Drawing Sheets

Related U.S. Application Data continuation of application No. 15/814,848, filed on Nov. 16, 2017, now Pat. No. 11,019,175.

(60) Provisional application No. 62/548,192, filed on Aug. 21, 2017, provisional application No. 62/431,011, filed on Dec. 7, 2016, provisional application No. 62/423,525, filed on Nov. 17, 2016.

(51) Int. Cl.
*G06F 16/182* (2019.01)
*G06F 16/2457* (2019.01)
*H04L 67/1004* (2022.01)
*H04L 67/1097* (2022.01)
*H04L 67/02* (2022.01)
*H04L 69/16* (2022.01)

(52) U.S. Cl.
CPC ...... *G06F 16/1827* (2019.01); *G06F 16/2457* (2019.01); *H04L 67/1004* (2013.01); *H04L 67/1097* (2013.01); *G06F 2212/1016* (2013.01); *H04L 67/02* (2013.01); *H04L 69/16* (2013.01)

(56) References Cited

U.S. PATENT DOCUMENTS

| | | | |
|---|---|---|---|
| 2009/0125796 A1 | 5/2009 | Day et al. | |
| 2010/0094988 A1* | 4/2010 | Chang | H04L 41/5058 709/224 |
| 2010/0103042 A1 | 4/2010 | Bishop et al. | |
| 2011/0289268 A1 | 11/2011 | Patel et al. | |
| 2012/0180071 A1 | 7/2012 | Lesandro et al. | |
| 2012/0230193 A1 | 9/2012 | Fang | |
| 2013/0290070 A1 | 10/2013 | Abraham et al. | |
| 2013/0304906 A1* | 11/2013 | Yavilevich | H04L 67/535 709/224 |
| 2013/0324154 A1 | 12/2013 | Raghupathy et al. | |
| 2014/0089511 A1 | 3/2014 | McLean | |
| 2014/0337472 A1 | 11/2014 | Newton et al. | |
| 2015/0256423 A1 | 9/2015 | Stearns | |
| 2015/0256583 A1 | 9/2015 | Rosenzweig et al. | |
| 2015/0351008 A1* | 12/2015 | Mayor | H04W 48/16 455/41.2 |
| 2016/0062873 A1* | 3/2016 | Cotugno | G06F 11/2268 717/131 |
| 2016/0180102 A1 | 6/2016 | Kim et al. | |
| 2016/0269482 A1 | 9/2016 | Jamjoom et al. | |
| 2016/0323706 A1 | 11/2016 | Splaine et al. | |
| 2017/0126818 A1 | 5/2017 | Kang | |
| 2017/0243273 A1 | 8/2017 | Ward, Jr. | |
| 2017/0300262 A1 | 10/2017 | Chen | |

OTHER PUBLICATIONS

U.S. Appl. No. 15/814,860, filed Nov. 16, 2017 captured on Oct. 6, 2023, 119 Pages.

International Preliminary Report on Patentability for International Application No. PCT/US2017/062003, mailed May 31, 2019, 08 Pages.

International Preliminary Report on Patentability for International Application No. PCT/US2017/062004, mailed May 31, 2019, 07 Pages.

International Search Report and Written Opinion for international Application No. PCT/US2017/062003, mailed Feb. 7, 2018, 9 Pages.

International Search Report and Written Opinion for International Application No. PCT/US2017/062004, mailed Feb. 8, 2018, 8 Pages.

* cited by examiner

METHOD FOR REAL-TIME DATA ACQUISITION AND RETRIEVAL USING A PASS-THROUGH SCALABLE ARCHITECTURE

CROSS-REFERENCE TO RELATED APPLICATIONS

This Application is a continuation of U.S. application Ser. No. 17/239,200, filed Apr. 23, 2021, which claims priority from U.S. application Ser. No. 15/814,848, filed Nov. 16, 2017, which claims priority from U.S. Provisional Application No. 62/423,525, filed Nov. 17, 2016, U.S. Provisional Application No. 62/431,011, filed Dec. 7, 2016, and U.S. Provisional Application No. 62/548,192, filed Aug. 21, 2017, the entirety of each of which is incorporated by reference herein.

DETAILED DESCRIPTION OF SEVERAL EMBODIMENTS

Systems and methods described herein may perform real-time data acquisition and retrieval. In some embodiments, systems and methods for real-time data acquisition and retrieval may use a pass-through scalable architecture. The architecture may provide anyone the ability to gather data elements from an application or other software (such as a video player), store them in a remote database in real-time, and retrieve the collected data for later use.

Some embodiments may provide a method for real-time data acquisition and retrieval using a pass-through scalable architecture enabling the ability to gather data elements from an application or other software (such as a video player) and store them in a remote database in real-time.

Some embodiments may provide a method for real-time data acquisition and retrieval using a pass-through scalable architecture that creates a one-to-one connection between the software from which data is being acquired and a remote database for storing the data.

Some embodiments may provide a method for real-time data acquisition and retrieval using a pass-through scalable architecture that provides for dynamic loading of data elements to capture, from a database, at software runtime.

Some embodiments may provide a method for real-time data acquisition and retrieval using a pass-through scalable architecture that determines the specific server to which to make a connection by examining the speed of the servers prior to initiating the connection from the software.

Some embodiments may provide a method for real-time data acquisition and retrieval using a pass-through scalable architecture that increases the number of servers available for a one-to-one connection from the server based upon analysis of the overall performance and capacity of the system.

Some embodiments may provide a method for real-time data acquisition and retrieval using a pass-through scalable architecture that increases the number of servers available for a one-to-one connection from the server based upon analysis of the overall performance and capacity of the system.

Some embodiments may provide a method for real-time data acquisition and retrieval using a pass-through scalable architecture that enables integration, through software code programmed to communicate with the invention, between end-user systems (e.g., a software application or a website) for a one-to-one connection between system and server for the purpose of retrieving data.

These and/or other features may be enabled by including and/or installing beacon code (also referred to herein as a "beacon") within software elements (e.g., applications) of a device. The beacon may correspond to a customer (or user), an application, or both. As described herein, the beacon may collect data from the software in which it is installed and/or from hardware elements of the device. The gathered data may be stored remotely and accessed later.

Figure 1:
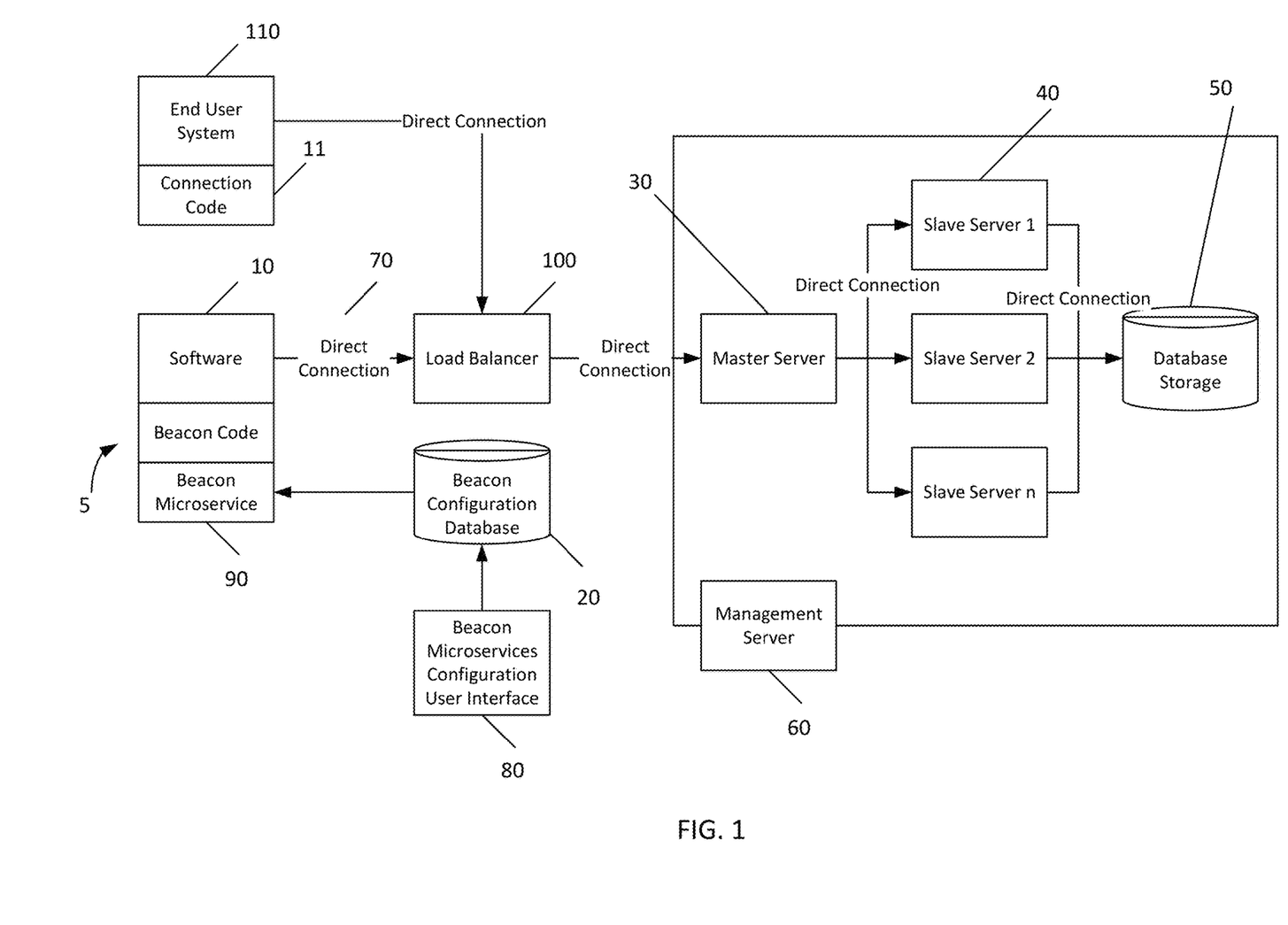
FIG. 1 shows an architecture for real-time data acquisition and retrieval according to an embodiment of the invention.

FIG. 1 shows an architecture for real-time data acquisition and retrieval according to an embodiment of the invention. The architecture may include at least one device 5 comprising software with beacon code 10 installed. For example, device 5 may be any computer (e.g., laptop, PC, smartphone, tablet, etc.), and the software may be a video player or other software configured to process content. The architecture may include a configuration database 20 including configuration data for beacon microservices 90, from which configuration data for beacon microservices 90 may be retrieved at a time when the software initiates beacon code 10, as described in greater detail below. The architecture may include one or more master servers 30 that may handle parsing out a request from beacon code for a direct connection to the database, one or more slave servers 40 that may create the direct connection between the beacon code and the database, a storage database 50 that may store the data that is passed through the direct connection from the beacon microservices installed within the beacon code, a management server 60 that may monitor the capacity and speed of master servers and instantiates new servers as needed, a direct connection 70 (such as through web sockets or TCP sockets) tunneled from the beacon code to the storage database, a beacon microservices configuration user interface 80 that may enable the management of beacon microservices (which may represent the specific data elements the beacons are intended to capture from the software), and an end-user system 110 with connection code 11 that may enable data retrieval through a process similar to a data acquisition process. In some embodiments, device 5 and end-user system 110 may be the same device or subcomponents of a single system. In other embodiments, device 5 and end-user system 110 may be separate elements of the architecture.

Beacon microservices 90 may describe what data to collect as specified by the user through a graphical user interface, such as user interface 80. Once the end-user has begun to employ the software (such as for playing a video), beacon code 10 may establish a direct connection 70 to master server 30 through load balancer 100, which may determine to which master server 30 the connection should be established (e.g., based on network issues and/or server 30 load). Master server 30 may pass direct connection 70 onto slave server 40, which may establish a connection to storage database 50, thereby creating a complete pass-through between beacon 10 and to storage database 50 directly. Management server 60 may continually monitor master servers 30 to determine if more master servers 30 are needed (e.g., based on overall load and capacity of each master server 30 and slave server 40) and instantiate more master servers 30 as appropriate. Load balancer 100 may determine to which master server 30 an incoming direct connection 70 is to be directed.

End-user system 110 may include connection code 11 to establish direct connection 70 to master server 30, and subsequently, slave server 40, to allow end user system 110 to retrieve data from storage database 50 over a one-to-one, direct connection 70. For example, end-user system 100 may retrieve data added to storage database 50 by beacon 10 of device 5.

Figure 2:
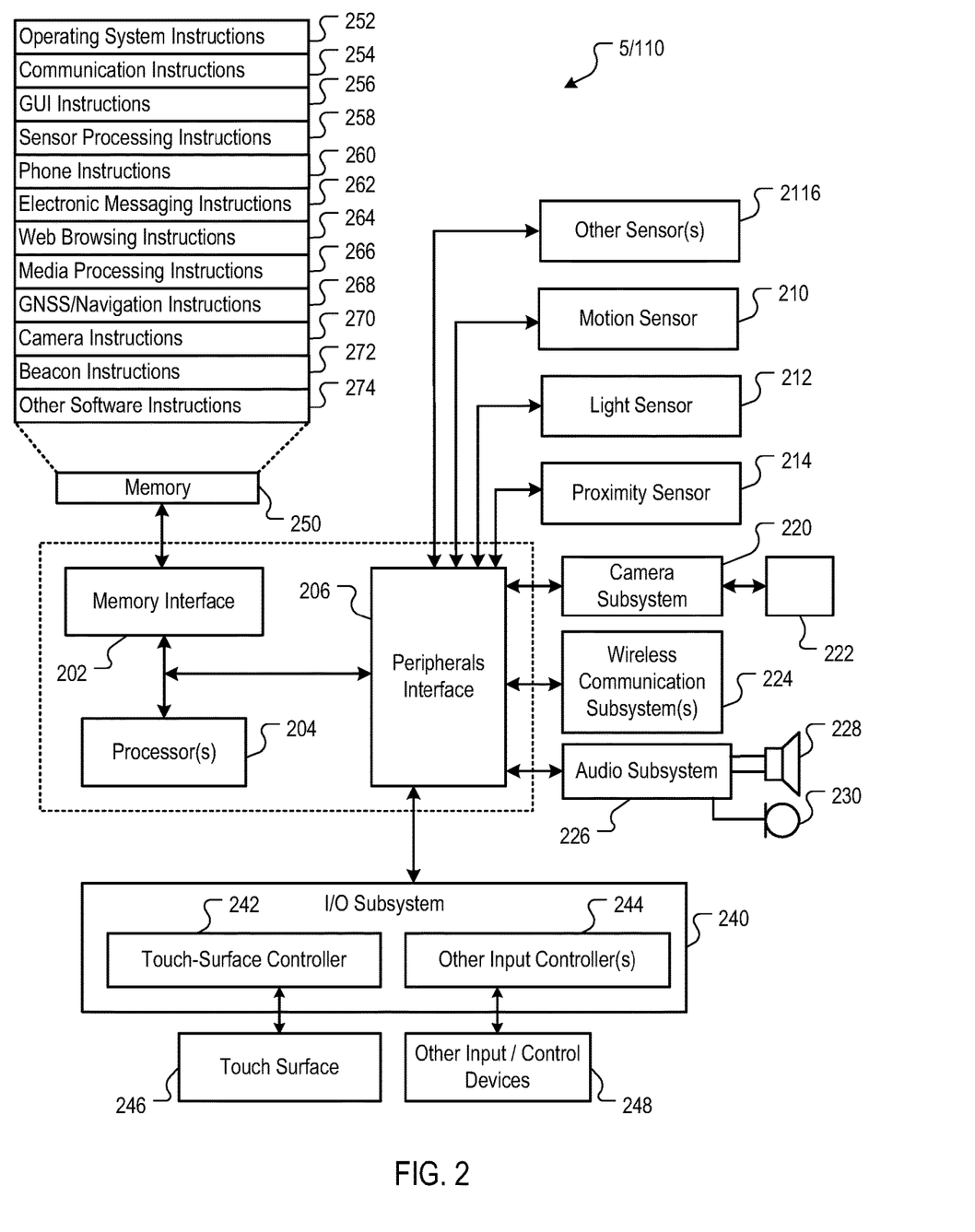
FIG. 2 shows a block diagram of an example computing device according to an embodiment of the invention.

FIG. 2 is a block diagram of an example computing device, for example a computing device configured to function as device 5 and/or end-user system 110. Computing device 5/110 may include a memory interface 202, one or more data processors, image processors, and/or central processing units 204, and a peripherals interface 206. The memory interface 202, the one or more processors 204, and/or the peripherals interface 206 may be separate components or may be integrated in one or more integrated circuits. One or more communication buses or signal lines may couple the various components in the computing device 5/110.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wireless communication subsystems 224, which can include radio frequency receivers and transmitters and/or optical (e.g., infrared) receivers and transmitters. For example, the BTLE and/or WiFi communications described above may be handled by wireless communication subsystems 224. The specific design and implementation of the communication subsystems 224 may depend on the communication network(s) over which the computing device 5/110 is intended to operate. For example, the computing device 5/110 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 5/110 can be configured as a base station for other wireless devices and/or to provide a WiFi service.

An audio subsystem 226 may be coupled to a speaker 228 and a microphone 530 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to the computing device 5/110 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, the computing device 5/110 may present recorded audio and/or video files, such as MP3, AAC, and MPEG files. In some implementations, the computing device 110 may include the functionality of an MP3 player, such as an iPod™. The computing device 5/110 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store beacon instructions 272 to facilitate other processes and functions, such as the beacon features described herein. In some embodiments, as described herein, beacon instructions 272 may be included in and/or added to application instructions (e.g., other software instructions 274).

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the computing device 5/110 may be implemented in hardware and/or in software, including in one or more signal processing and/or application specific integrated circuits.

Figure 3:
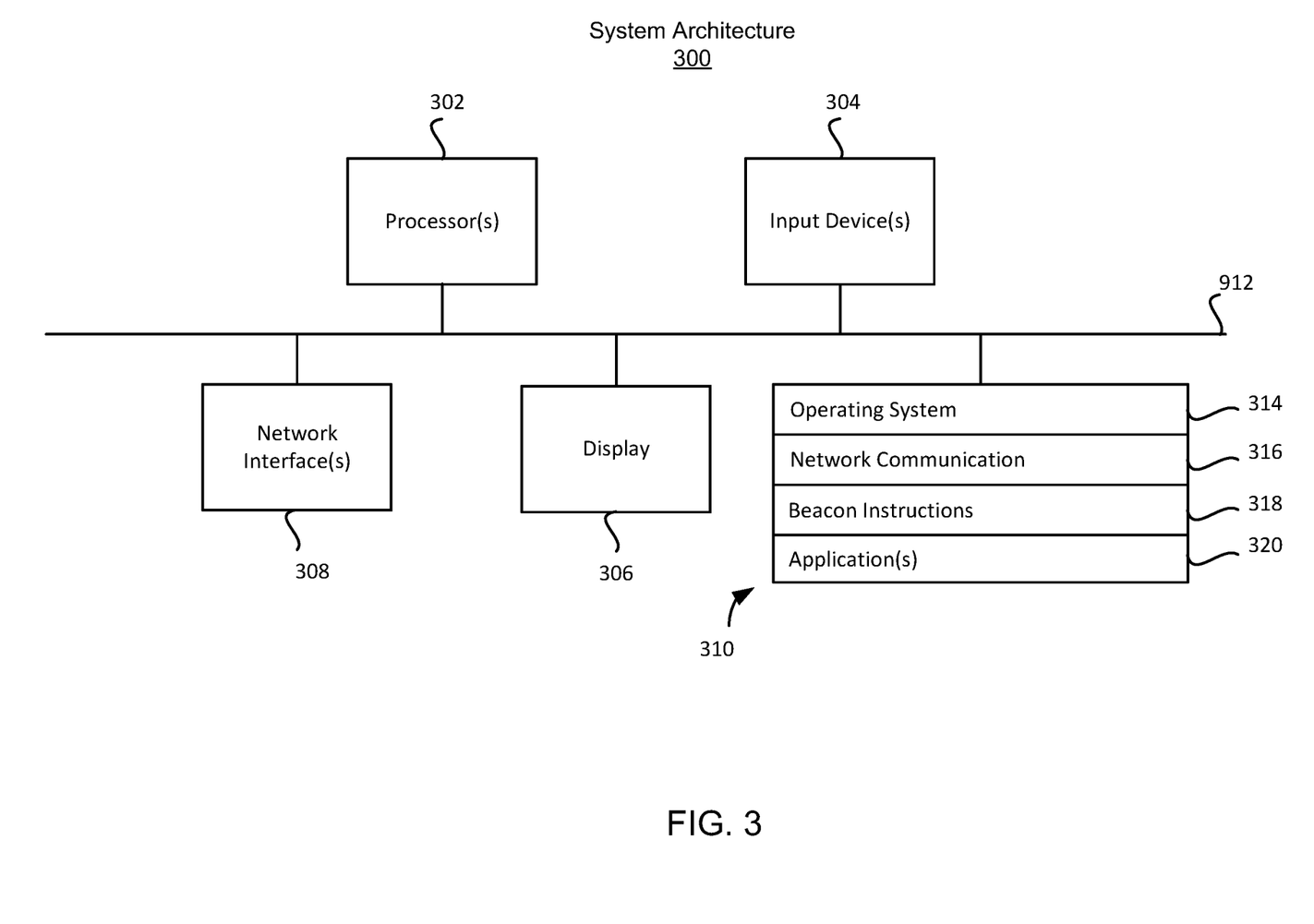
FIG. 3 shows a block diagram of an example system architecture according to an embodiment of the invention

FIG. 3 is a block diagram of an example system architecture 300 that may implement the features and processes associated with master server 30, slave server 40, management server 60, load balancer 100, and/or other devices described herein.

The architecture 300 may be implemented on any electronic device that runs software applications derived from compiled instructions, including without limitation personal computers, servers, smart phones, media players, electronic tablets, game consoles, email devices, etc. In some implementations, the architecture 300 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, etc.).

Beacon instructions 318 can include instructions that provide functions for interacting with beacon code 10 of user device 110 as described herein. For example, beacon instructions 318 may establish direct connections between end-user device 110 and storage database 50 and/or device 5 and storage database 50 as described herein.

Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Device 5 may include a variety of software elements into which beacon code 10 may be added. Software with beacon code 10 may include any software installed on device 5 and configured to generate data. Beacon code 10 may include added code that may be unnecessary to the core operation of the software, but which may capture data produced by the software.

Figure 4:
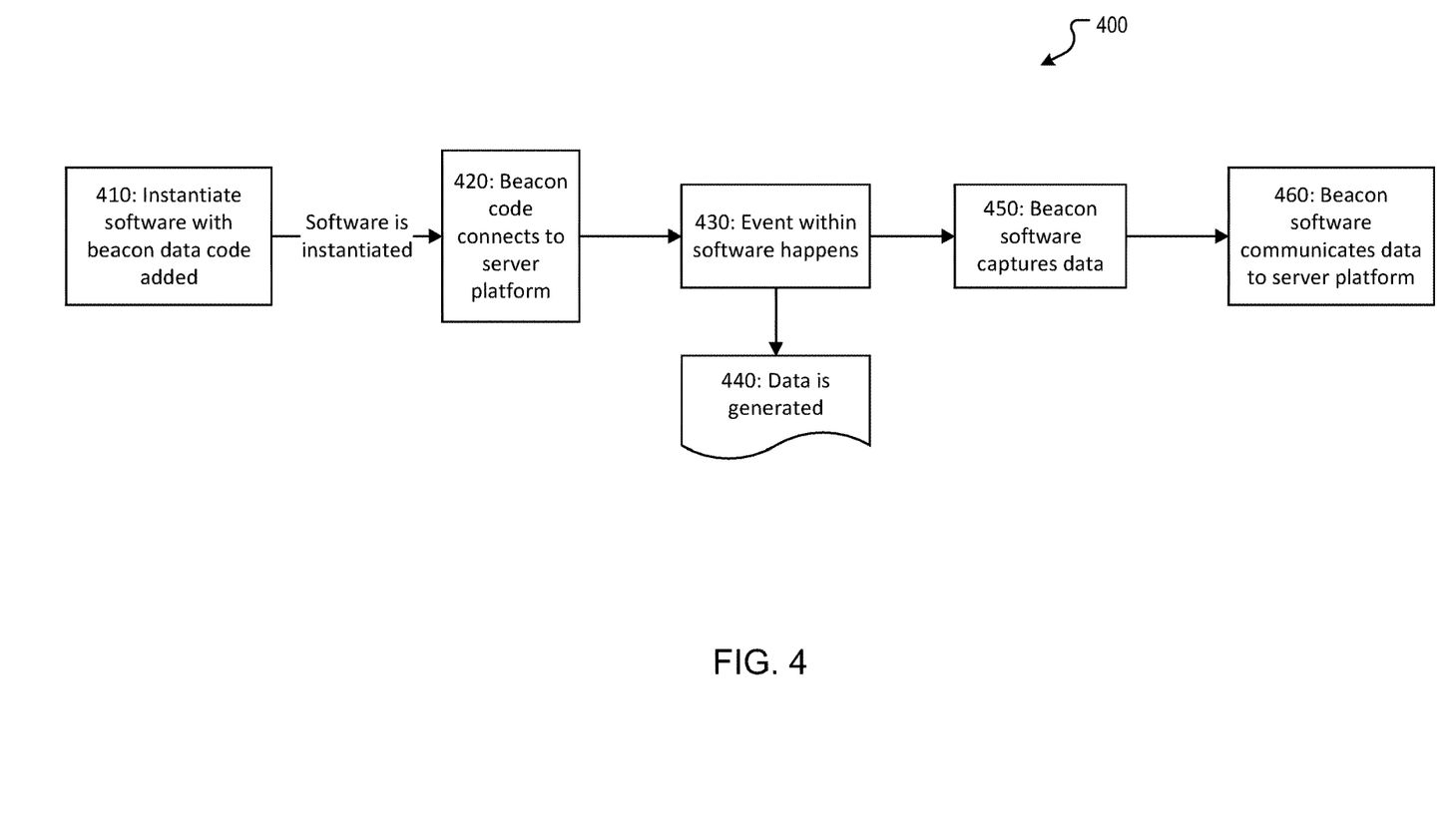
FIG. 4 shows a process for data capture and communication according to an embodiment of the invention.

FIG. 4 shows a process 400 for data capture and communication according to an embodiment of the invention. At 410, the software (e.g., a video player) may be instantiated. Instantiating the software may instantiate the beacon code 10 as well.

At 420, beacon code 10 may connect to the server platform to establish direct connection 70. Formation and establishment of direct connection 70 may provide a method by which beacon code 10 ultimately connects to storage database 50. Direct connection 70 may be formed by HTTP web sockets, TCP sockets, or other mechanisms. In some embodiments, to ensure the fastest method to store the data (i.e., the lowest latency between beacon code 10 and slave server 40) gathered by beacon code 10, direct connection 70 may be brokered to a slave server 40, through master server 30, which has the fastest response time.

Figure 5:
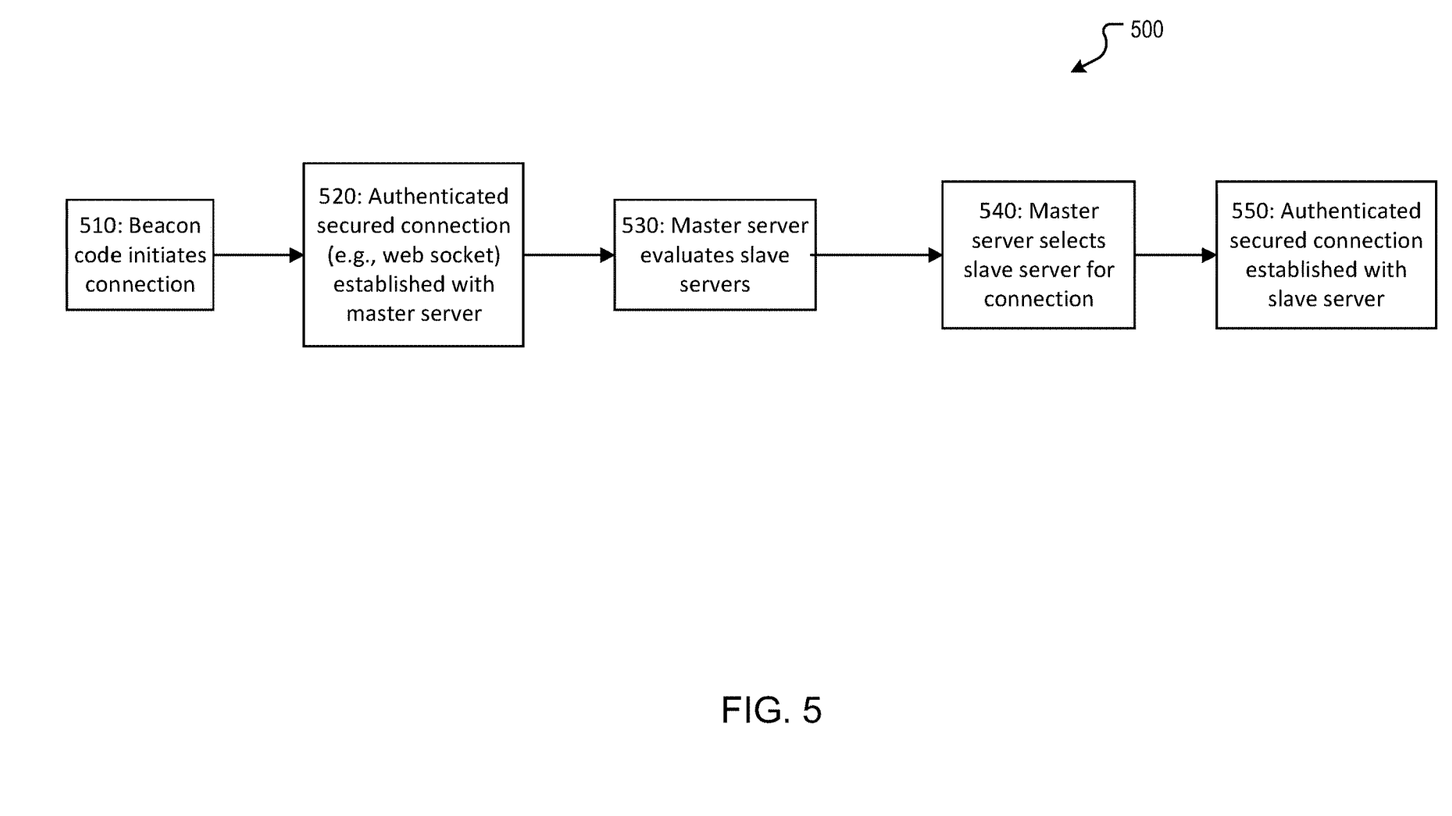
FIG. 5 shows a secured connection process according to an embodiment of the invention.

FIG. 5 shows an example process 500 for connecting device 5 and slave servers 40 in detail. At 510, beacon code 10 may start the connection process 500. For example, beacon code 10 may initially connect to load balancer 100. Load balancer 100 may identify master server 30 for handling direct connection 70 between end-user system 110 with beacon code 10 and the server platform. For example, load balancer 100 may select a particular master server 30 from a plurality of possible master servers 30 based on at least one performance metric (e.g., capabilities, load, and/or bandwidth available to the master servers 30), for example.

At 520, load balancer 100 may pass the direct connection 70 to selected master server 30 to establish an authenticated, secured connection between device 5 and master server 50. Once the direct connection 70 is established between device 5 and master server 30, beacon code 10 may be connected to the server platform.

Master server 30 may pass the direct connection 70 to a slave server 40 selected from a plurality of possible slave servers 40 based on capabilities, load, and/or bandwidth available to the slave servers 40, for example. At 530, master server 30 may evaluate available slave servers 40 to identify one for connecting with device 5 based on at least one performance metric (e.g., capabilities, load, and/or bandwidth available to the slave servers 40). Master server 30 may function as a "traffic cop" that load balances across all of the available slave servers 40 that it manages. Master server 30 may examine the capacity, availability, and speed of each slave server 40 in its cluster to determine which is the optimal slave server 40 to send the direct connection 70 request from beacon code 10.

At 540, master server 30 may select the identified slave server. At 550, master server 30 may pass the direct connection 70 to selected slave server 40 to establish an authenticated, secured connection between device 5 and slave server 40. In some embodiments, selected slave server 40 may pass the direct connection 70 to storage database 50, thereby forming a data connection between device 5 and storage database 50. In some embodiments, direct connection 70 may be maintained between device 5 and slave server 40, and slave server 40 may perform the role of making the actual direct connection 70 with the beacon code 10 and passing data obtained through that connection onto storage database 50. Direct connection 70 may be a persistent connection allowing beacon code 10 to send captured data to storage database 50 as the data is captured. Storage database 50 may store all incoming data received from beacon code 10 and make that data available to other external software (e.g., through an API, or Application Programming Interface), such as software on end-user system 110.

Additionally, connecting to the server platform may include connecting to configuration database 20. Beacon code 10 may connect to configuration database 20 by the same direct connection 70 and/or by a separate connection. Beacon code 10 may receive data event code from configuration database 20. The data event code may define the data generated by the software that is to be captured by beacon code 10. In some embodiments, the data event code may be part of beacon microservices 90.

Beacon configuration database 20 may store beacon microservices 90. Beacon configuration database 20 may contain information about beacon microservices 90 for each user and/or each device 5. Beacon microservices 90 may include code that define how beacon code 10 may capture specific data elements from the software. Beacon microservices 90 may define the kind of data to be collected (e.g., the title of a video being played or when a video buffers), the frequency of collection, the global region where the data should or shouldn't be collected, etc. Beacon microservices 90 may be loaded into beacon code 10 when the user initiates the software (e.g., by loading a video for playback).

Returning to FIG. 4, at 430, an event may occur during execution of the software. For example, while a user is watching a video using the video player, a buffering event may occur. At 440, the event may generate data (e.g., describing the portion of video that was buffered, network and/or device 5 conditions that caused the buffering, etc.).

At 450, beacon code 10 may capture the data generated by the event. For example, beacon code 10 may capture the data if beacon code 10 received data event code indicating beacon code 10 should respond events of the type that generated the data. In the buffering example, the data event code may have indicated that beacon code 10 should capture data for buffering events. Thus, beacon code 10 may capture the data generated at 440. At 460, beacon code 10 may send the captured data to storage database 50 by direct connection 70.

In some embodiments, master servers 30 may be monitored and/or instantiated by management server 60. Management server 60 may oversee all master servers 30 in the system. Management server 60 may examine each master server 30 on a real-time and/or periodic basis to determine how each master server 30 is performing, each master server's 30 capacity for receiving new direct connections 70, and/or how quickly each master server 30 is operating. Based on analysis of this data, management server 60 may decide to instantiate a new master server 30 (with corresponding slave servers 40) to provide for faster response in accepting new direct connections 70 from beacon code 10.

In some embodiments, device 5 and/or end-user system 110 may provide user access to a beacon microservices configuration user interface (UI) 80. The UI 80 may enable the user of device 5 and/or end-user system 110 to specify which beacon microservices 90 that should be loaded at the time of beacon code 10 instantiation. For example, the user may select a checkbox or other UI element to indicate which beacon microservices 90 they want to employ to their beacon code 10 and then may select a save button or other UI element to commit the selections to beacon configuration database 20. The UI 80 may include functionality to create custom beacon microservices 90 in some embodiments.

Figure 6:
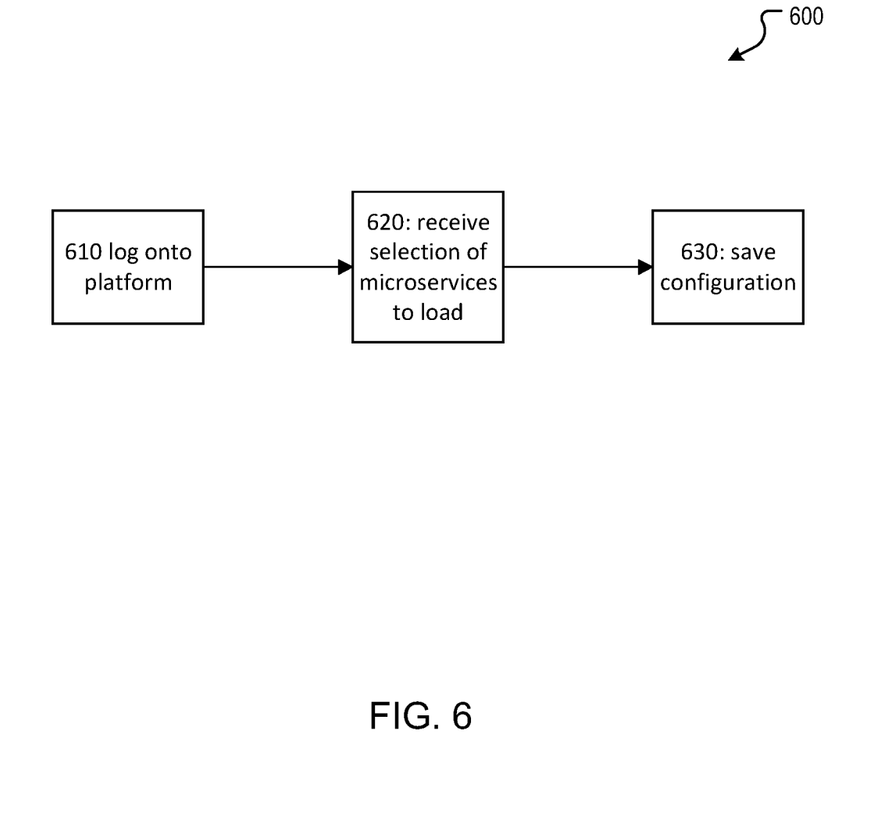
FIG. 6 shows a configuration process according to an embodiment of the invention.

FIG. 6 shows a configuration process 600 according to an embodiment of the invention. At 610, device 5 may register a user login (e.g., the user may log in with a username and password). Device 5 may connect with beacon configuration database 20, for example as described above. At 620, device 5 may receive selection of beacon microservices 90 and/or configuration of custom beacon microservices 90 from user input. At 630, device 5 may save the selection and/or configuration locally and/or may send the configuration to beacon configuration database 20. The next time beacon code 10 instantiates, the saved beacon microservices 90 may be loaded by beacon code 10 as described above.

The following is an example use case involving the systems and methods described herein. A user employs some software on device 5 (e.g, a computer or mobile device). This software, provided by a company who developed it, includes beacon code 10 for the purpose of gathering information from the use of the software. For example, if the software is a video player, the data gathered could be the title of the video being played, when the video is started, when the video is stopped, when the video buffers, etc. The company who owns the software utilizes the beacon microservices configuration user interface 80 to specify which data elements to capture, at what frequency to capture them, where in the world they should be captured, and other configuration aspects. The company's choices are stored in the beacon configuration database 20 as software code that can be loaded into the beacon code 10 as beacon microservices 90.

Once the software has been opened by the end user and the beacon code 10 instantiated, a direct connection 70 is established and the beacon microservices 90 are loaded into the beacon code 10. Beacon microservices 90 immediately begin to capture the data they are intended to capture. The direct connection 70 established by the beacon code 10 at the time of instantiation to retrieve the beacon microservices 90 from the beacon configuration database 20 is also used to funnel data through the system. As such, the direct connection 70 is brokered to a master server 30 by the load balancer 100, which determines the best master server 30 to which to send the request (based on real-time analysis of master server 30 performance, capacity, etc.). Once the master server 30 has been selected, the direct connection 70 is routed to it from the load balancer 100. The master server 30 then selects a slave server 40 to which to pass on the direct connection 70. The direct connection 70 is then established with the slave server 40, which then creates a secondary connection to the storage database 50 and passes along the stream of data coming from the beacon code 10 through the direct connection 70, thereby creating a direct "pass-through" link between beacon code 10 and storage database 70.

As the system operates, the management server 60 analyzes the master server 30 operations in real-time to determine how well the master servers 30 are performing. In the event that there is poor performance or over utilization, the management server 60 can choose to instantiate a new instance of a master server 30, which will be added to the load balancer pool of available master servers 30. End user systems 110 (such as a web page or a software application) with connection code 11 can retrieve data from the storage database 50 by establishing a direct connection 70 to a master server 30 which brokers the connection request to a slave server 40 that establishes the one-to-one connection to the storage database 50 for the purposes of high-speed data storage and/or retrieval.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures that highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A device configured to monitor device operations, comprising:
   a processor;
   a non-transitory memory; and
   a beacon comprising code that, when executed by the processor, causes the processor to:
      establish a direct connection with a remote system comprising a storage database and a load balancer configured to receive a request for the direct connection from the beacon and select a device to service the direct connection in response to the request, wherein establishing the direct connection comprises:
   sending, by the beacon, the request for the direct connection to the load balancer, and
   establishing the direct connection with the device;
gather data indicative of at least one of the plurality of operations as specified by at least one beacon microservice; and
send the data through the direct connection to store the data in the storage database.

2. The device of claim 1, wherein the direct connection is established by:
establishing communications with the load balancer of the remote system; and
redirecting the communications to a slave server of the remote system, wherein the slave server is in communication with the storage database.

3. The device of claim 1, wherein the direct connection between the device and the remote system uses an HTTP web socket or a TCP socket.

4. The device of claim 1, wherein the beacon, when executed by the processor, further causes the processor to:
receive the at least one beacon microservice from a beacon configuration database of the remote system; and
configure the beacon according to the received at least one beacon microservice.

5. The device of claim 1, wherein each beacon microservice specifies at least one data element for the beacon to capture, at least one frequency at which the beacon captures the data, at least one location at which the beacon captures the data, or a combination thereof.

6. The device of claim 1, further comprising a user interface configured to receive user information selecting at least one of the beacon microservices, modifying at least one of the beacon microservices, creating at least one of the beacon microservices, or a combination thereof.

7. The device of claim 6, wherein the beacon, when executed by the processor, further causes the processor to send the user information to a beacon configuration database of the remote system.

8. A system for software operations monitoring comprising:
a device of comprising:
   a processor;
   a non-transitory memory; and
   a beacon comprising code that, when executed by the processor, causes the processor to:
      establish a direct connection with a remote system comprising a storage database and a load balancer configured to receive a request for the direct connection from the beacon and select a device to service the direct connection in response to the request, wherein establishing the direct connection comprises:
         sending, by the beacon, the request for the direct connection to the load balancer, and
         establishing the direct connection with the device;
      gather data indicative of at least one of the plurality of operations as specified by at least one beacon microservice; and
      send the data through the direct connection to store the data in the storage database; and
the remote system comprising:
   the load balancer configured to receive the request for the direct connection from the beacon and select a master server from among a plurality of master servers to handle the request;
   the plurality of master servers, each master server being configured to receive the request from the load balancer and select a slave server from among a plurality of slave servers to handle the request;
   the plurality of slave servers, each slave server being configured to receive the request from at least one of the master servers and establish the direct connection between the device and the slave server; and
   the storage database in communication with at least one of the slave servers.

9. The system of claim 8, wherein the load balancer is configured to select the master server based on at least one performance metric of at least one of the plurality of master servers.

10. The system of claim 8, wherein the load balancer is configured to instantiate at least one of the plurality of master servers.

11. The system of claim 8, wherein each master server is configured to select the slave server based on at least one performance metric of at least one of the plurality of slave servers.

12. The system of claim 8, wherein each master server is configured to instantiate at least one of the plurality of slave servers.

13. The system of claim 8, further comprising a beacon configuration database configured to provide the at least one beacon microservice to the beacon.

14. A method of monitoring operations of a device, comprising:
instantiating a beacon comprising code stored in a non-transitory memory of the device;
establishing, by the beacon, a direct connection with a remote system comprising a storage database and a load balancer configured to receive a request for the direct connection from the beacon and select a device to service the direct connection in response to the request, wherein establishing the direct connection comprises:
   sending, by the beacon, the request for the direct connection to the load balancer, and
   establishing the direct connection with the device;
gathering, by the beacon data indicative of at least one of a plurality of operations as specified by at least one beacon microservice; and
sending, by the beacon, the data through the direct connection to store the data in the storage database.

15. The method of claim 14, wherein establishing the direct connection comprises:
establishing communications with the load balancer of the remote system; and
redirecting the communications to a slave server of the remote system, wherein the slave server is in communication with the storage database.

16. The method of claim 14, wherein the direct connection between the device and
the remote system uses an HTTP web socket or a TCP socket.

17. The method of claim 14, further comprising:
receiving, by the beacon, the at least one beacon microservice from a beacon configuration database of the remote system; and
automatically configuring the beacon according to the received at least one beacon microservice.

18. The method of claim 14, wherein each beacon microservice specifies at least one data element for the beacon to capture, at least one frequency at which the beacon captures the data, at least one location at which the beacon captures the data, or a combination thereof.

19. The method of claim 14, further comprising receiving, by a user interface, user information selecting at least one of the beacon microservices, modifying at least one of the beacon microservices, creating at least one of the beacon microservices, or a combination thereof.

20. The method of claim 19, further comprising sending, by the beacon, the user information to a beacon configuration database of the remote system.

21. The method of claim 14, further comprising:
receiving, by the load balancer of the remote system, a request for a direct connection from the beacon;
selecting, by the load balancer, a master server from among a plurality of master servers to handle the request;
receiving, by the selected master server, the request from the load balancer;
selecting, by the selected master server, a slave server from among a plurality of slave servers to handle the request;
receiving, by the selected slave server, receive the request from at least one of the master servers; and
establishing, by the selected slave server, the direct connection between the device and the slave server;
wherein the storage database is in communication with the selected slave server.

22. The method of claim 21, wherein the master server is selected based on at least one performance metric of at least one of the plurality of master servers.

23. The method of claim 21, further comprising instantiating, by the load balancer, at least one of the plurality of master servers.

24. The method of claim 21, wherein the slave server is selected based on at least one performance metric of at least one of the plurality of slave servers.

25. The method of claim 21, further comprising instantiating, by the selected master server, at least one of the plurality of slave servers.

26. The method of claim 21, further comprising providing, by a beacon configuration database, the at least one beacon microservice to the beacon.

* * * * *